(12) United States Patent  (10) Patent No.: US 9,178,372 B2
Zhao et al.  (45) Date of Patent: Nov. 3, 2015

(54) CHARGING CONTROL METHOD FOR A RECHARGEABLE BATTERY AND PORTABLE COMPUTER

(75) Inventors: Shuangcheng Zhao, Beijing (CN); Xiaoren Cheng, Beijing (CN); Ling Yao, Beijing (CN); Weizhi Lin, Beijing (CN)

(73) Assignees: Lenovo (Beijing) Limited, Beijing (CN); Beijing Lenovo Software Ltd., Beijing (CN)

( * ) Notice: Subject to any disclaimer, the term of this patent is extended or adjusted under 35 U.S.C. 154(b) by 368 days.

(21) Appl. No.: 13/637,967

(22) PCT Filed: Mar. 30, 2011

(86) PCT No.: PCT/CN2011/000544
§ 371 (c)(1),
(2), (4) Date: Dec. 13, 2012

(87) PCT Pub. No.: WO2011/120334
PCT Pub. Date: Oct. 6, 2011

(65) Prior Publication Data
US 2013/0132742 A1    May 23, 2013

(30) Foreign Application Priority Data
Apr. 2, 2010  (CN) .......................... 2010 1 0140866

(51) Int. Cl.
*G06F 1/00* (2006.01)
*H02J 7/00* (2006.01)
*G06F 1/26* (2006.01)

(52) U.S. Cl.
CPC ................. *H02J 7/0052* (2013.01); *G06F 1/26* (2013.01); *H02J 7/0073* (2013.01)

(58) Field of Classification Search
CPC ................. H01M 10/4257; H01M 2010/4271; H02J 7/0091
USPC .......................................... 713/300
See application file for complete search history.

(56) References Cited

U.S. PATENT DOCUMENTS 5,557,188 A * 9/1996 Piercey ......................... 320/134
6,337,560 B1 * 1/2002 Kalogeropoulos et al. ... 320/160
(Continued)

FOREIGN PATENT DOCUMENTS

CN  1241042 A  1/2000
CN  1655419 A  8/2005
(Continued)

OTHER PUBLICATIONS

International Search Report of the State Intellectual Property Office, the P.R. China, in application No. PCT/CN2011/000544, dated Jun. 9, 2011, published as WO2011120334A1, Oct. 6, 2011.

*Primary Examiner* — Vincent Tran
(74) *Attorney, Agent, or Firm* — Kinney & Lange, P.A.

(57) ABSTRACT

Disclosed are charging control methods for a rechargeable battery and portable computers. The charging control method includes acquiring a control parameter for a charge current of the rechargeable battery; modifying, based on the control parameter, the charge current from a first charge current to a second charge current less than the first charge current; and charging the rechargeable battery with the second charge current. Compared with conventional methods of charging the battery always with the maximal charge current, the present disclosure can improve the battery's lifetime.

6 Claims, 3 Drawing Sheets

(56) References Cited

U.S. PATENT DOCUMENTS

| | | | |
|---|---|---|---|
| 7,202,635 B2 * | 4/2007 | Patino et al. | 320/160 |
| 7,615,969 B2 * | 11/2009 | Meng et al. | 320/150 |
| 7,619,389 B2 * | 11/2009 | Wanibuchi | 320/128 |
| 8,471,524 B2 * | 6/2013 | Xiao et al. | 320/107 |
| 8,922,329 B2 * | 12/2014 | Davis et al. | 340/3.1 |
| 2004/0196006 A1 * | 10/2004 | Kawaguchi et al. | 320/132 |
| 2005/0017683 A1 * | 1/2005 | Smallwood et al. | 320/128 |
| 2007/0139008 A1 * | 6/2007 | Sterz et al. | 320/125 |
| 2008/0211460 A1 * | 9/2008 | Tarng et al. | 320/161 |
| 2008/0218130 A1 * | 9/2008 | Guo et al. | 320/162 |
| 2008/0238362 A1 * | 10/2008 | Pinnell et al. | 320/107 |
| 2008/0238363 A1 * | 10/2008 | Bourilkov et al. | 320/107 |

FOREIGN PATENT DOCUMENTS

| | | |
|---|---|---|
| CN | 201167243 Y | 12/2008 |
| CN | 101599651 A | 12/2009 |
| JP | 2009033843 A | 2/2009 |

\* cited by examiner

CHARGING CONTROL METHOD FOR A RECHARGEABLE BATTERY AND PORTABLE COMPUTER

TECHNICAL FIELD

The present disclosure relates to the field of electronics, and more particularly, to charging control methods for a rechargeable battery and portable computers.

BACKGROUND

Some of users having portable computers often have their computers operated with power supplied from a rechargeable battery. As a result, the rechargeable battery may undergo a cycle of charging and discharging per day, and the number of such cycles may reach up to 300 or more in one year.

As well known, the number of cycles of charging and discharging for a rechargeable battery is limited. When the number exceeds a threshold, for example, 300, the usable capacity of the battery will decrease significantly, for example, to 70% or lower of the original capacity of the battery.

As the usable capacity of a rechargeable battery decreases, the battery cannot continuously supply power for a time period as long as required by the user. In the worst case, the battery cannot work, and must be replaced with a new one.

The inventors have found that the conventional scheme of charging a rechargeable battery with a constant voltage or current is one of factors leading to a shortened lifetime of the battery.

SUMMARY

One of the objects of the present disclosure is to provide a charging control method for a rechargeable battery, a charging control device and a portable computer, which can improve the lifetime of a rechargeable battery.

According to an embodiment of the present disclosure, a charging control method for a rechargeable battery is provided, comprising: acquiring a control parameter for a charge current of the rechargeable battery; modifying, based on the control parameter, the charge current from a first charge current to a second charge current less than the first charge current; and charging the rechargeable battery with the second charge current.

In the above charging control method, the control parameter for the charge current comprises: a first charge duration counted since starting charge; or a second charge duration counted since a voltage of the battery reaches a first preset voltage threshold; or current power level of the rechargeable battery.

In the above charging control method, if the control parameter for the charge current comprises the second charge duration counted since the voltage of the battery reaches the first preset voltage threshold, time counted from when the voltage of the battery reaches the first preset voltage threshold until the battery is fully charged is divided into at least two non-overlapping time periods each corresponding to a respective charge current, wherein a first one of any adjacent time periods of the at least two time periods corresponds to a charge current larger than that corresponding to a second one of the any adjacent time periods. When the second charge duration shifts from the first time period to the second time period, the charge current of the battery is modified, based on the control parameter, from a first charge current corresponding to the first time period to a second charge current corresponding to the second time period.

In the above charging control method, the charge current of the battery is a maximal charge current until the voltage of the battery reaches the first preset voltage threshold.

In the above charging control method, the control parameter of the charge current further comprises a temperature of the battery. As the temperature of the battery increases, a duration in which the battery is charged with a charge current exceeding a preset current intensity is reduced.

According to another embodiment of the present disclosure, a portable computer is provided comprising a mainboard, a rechargeable battery connected to the mainboard, and a charging circuit configured to charge the battery. The portable computer further comprises a charging control device configured to control charging of the battery and comprising: a first acquisition module configured to acquire a control parameter for a charge current of the battery; and a current control module configured to control the charging circuit based on the control parameter, so that the charge current generated by the charging circuit is modified from a first charge current to a second charge current less than the first charge current, and the battery is charged with the second charge current.

In the above portable computer, the control parameter for the charge current comprises: a first charge duration counted since starting charge; or a second charge duration counted since a voltage of the battery reaches a first preset voltage threshold; or current power level of the rechargeable battery.

In the above portable computer, if the control parameter for the charge current comprises the second charge duration counted since the voltage of the battery reaches the first preset voltage threshold, time counted from when the voltage of the battery reaches the first preset voltage threshold until the battery is fully charged is divided into at least two non-overlapping time periods each corresponding to a respective charge current, wherein a first one of any adjacent time periods of the at least two time periods corresponds to a charge current larger than that corresponding to a second one of the any adjacent time periods. When the second charge duration shifts from the first time period to the second time period, the current control module is configured to control the charging circuit, so that the charge current generated by the charging circuit is modified, based on the control parameter, from a first charge current corresponding to the first time period to a second charge current corresponding to the second time period.

In the above portable computer, the charge current of the battery is a maximal charge current until the voltage of the battery reaches the first preset voltage threshold.

In the above portable computer, the control parameter of the charge current further comprises a temperature of the battery. As the temperature of the battery increases, a duration in which the current control module controls the charging circuit to generate a charge current exceeding a preset current intensity is reduced.

According to a further embodiment of the present disclosure, a charging control method is provided comprising: acquiring a decision parameter for a charge mode; deciding, based on the decision parameter, whether a first charge mode or a second charge mode is adopted in a current charging operation; and charging a rechargeable battery with a first charge voltage in the first charge mode, and charging the rechargeable battery with a second charge voltage larger than the first charge voltage in the second charge mode.

In the above charging control method, the decision parameter comprises a number of recycles the battery has undergone. Said deciding, based on the decision parameter, whether a first charge mode or a second charge mode is adopted in a current charging operation comprises: deciding whether the number of recycles exceeds a first preset threshold of recycle number, and deciding to adopt the first charge mode in the current charging operation if the number of recycles exceeds the first preset threshold, or adopt the second charge mode if the number of recycles does not exceed the first preset threshold.

In the above charging control method, the decision parameter comprises an accumulated time for a die voltage of the battery remaining higher than a second preset voltage. Said deciding, based on the decision parameter, whether a first charge mode or a second charge mode is adopted in a current charging operation comprises: deciding whether the accumulated time for the die voltage of the battery remaining higher than the second preset voltage exceeds a first accumulated time threshold, and deciding to adopt the first charge mode in the current charging operation if the accumulated time exceeds the first accumulated time threshold, or adopt the second charge mode if the accumulated time does not exceed the first accumulated time threshold.

In the above charging control method, the decision parameter comprises a number of recycles the battery has undergone, and an accumulated time for a die voltage of the battery remaining higher than a second preset voltage. Said deciding, based on the decision parameter, whether a first charge mode or a second charge mode is adopted in a current charging operation comprises deciding whether the number of recycles exceeds a first preset threshold of recycle number, and whether the accumulated time for the die voltage of the battery remaining higher than the second preset voltage exceeds a first accumulated time threshold; deciding to adopt the first charge mode in the current charging operation if the number of recycles exceeds the first preset threshold, or if the accumulated time exceeds the first accumulated time threshold; if the number of recycles does not exceed the first preset threshold, and the accumulated time does not exceed the first accumulated time threshold, deciding further whether the number of recycles does not exceed a second preset threshold of recycle number less than the first present threshold, and whether the accumulated time does not exceed a second accumulated time threshold less than the first accumulated time threshold; and deciding to adopt the second charge mode in the current charging operation if the number of recycles does not exceed the second preset threshold, and the accumulated time does not exceed the second accumulated time threshold.

In the above charging control method, said deciding, based on the decision parameter, whether a first charge mode or a second charge mode is adopted in a current charging operation further comprises: deciding whether a power level of the battery remains above a first preset power level threshold for a first duration prior to a point when the number of recycles is between the first and second preset thresholds, and the accumulated time does not exceed the first accumulated time threshold, or a point when the accumulated time is between the first and second accumulated time thresholds, and the number of recycles does not exceed the first preset threshold; and deciding to adopt the first charge mode in the current charging operation if the power level of the battery remains above the first preset power level threshold, or adopt the second charge mode in the current charging operation if the power level of the battery does not remain above the first preset power level threshold.

In the above charging control method, said deciding, based on the decision parameter, whether a first charge mode or a second charge mode is adopted in a current charging operation further comprises: deciding whether a number of occurrences that a power level of the battery becomes below a second preset power level threshold is less than a third preset threshold for a second duration prior to a point when the number of recycles is between the first and second preset thresholds, and the accumulated time does not exceed the first accumulated time threshold, or a point when the accumulated time is between the first and second accumulated time thresholds, and the number of recycles does not exceed the first preset threshold, if a previous charge mode was the first charge mode; and deciding to adopt the second charge mode in the current charging operation if the number of occurrences is less than the third preset threshold, or adopt the first charge mode in the current charging operation if the number of occurrences is not less than the third preset threshold.

The above charging control method further comprises: acquiring a control parameter for a charge current of the battery while the battery is charged in the first or second charge mode; modifying, based on the control parameter, the charge current from a first charge current to a second charge current less than the first charge current; and charging the battery with the second charge current.

In the above charging control method, the control parameter for the charge current comprises: a first charge duration counted since starting charge; or a second charge duration counted since a voltage of the battery reaches a first preset voltage threshold; or current power level of the rechargeable battery.

In the above charging control method, if the control parameter for the charge current comprises the second charge duration counted since the voltage of the battery reaches the first preset voltage threshold, time counted from when the voltage of the battery reaches the first preset voltage threshold until the battery is fully charged is divided into at least two non-overlapping time periods each corresponding to a respective charge current, wherein a first one of any adjacent time periods of the at least two time periods corresponds to a charge current larger than that corresponding to a second one of the any adjacent time periods. When the second charge duration shifts from the first time period to the second time period, the charge current of the battery is modified, based on the control parameter, from a first charge current corresponding to the first time period to a second charge current corresponding to the second time period.

In the above charging control method, the charge current of the battery is a maximal charge current until the voltage of the battery reaches the first preset voltage threshold.

In the above charging control method, the control parameter of the charge current further comprises a temperature of the battery. As the temperature of the battery increases, a duration in which the battery is charged with a charge current exceeding a preset current intensity is reduced.

According to a still further embodiment of the present disclosure, a portable computer is provided comprising a mainboard, a rechargeable battery connected to the mainboard, and a charging circuit configured to charge the battery. The portable computer further comprises a first charging control device configured to control charging of the battery provided in the portable computer and comprising: a second acquisition module configured to acquire a decision parameter for a charge mode; a mode decision module configured to decide, based on the decision parameter, whether a first charge mode or a second charge mode is adopted in a current charging operation; and a voltage control module configured to control the charging circuit to charge the battery with a first charge voltage in the first charge mode, and to charge the battery with a second charge voltage larger than the first charge voltage in the second charge mode.

In the above portable computer, the decision parameter comprises a number of recycles the battery has undergone, and an accumulated time for a die voltage of the battery remaining higher than a second preset voltage. The mode decision module is configured to decide whether the number of recycles exceeds a first preset threshold of recycle number, and whether the accumulated time for the die voltage of the battery remaining higher than the second preset voltage exceeds a first accumulated time threshold, and decide to adopt the first charge mode in the current charging operation if the number of recycles exceeds the first preset threshold, or if the accumulated time exceeds the first accumulated time threshold. If the number of recycles does not exceed the first preset threshold, and the accumulated time does not exceed the first accumulated time threshold, the mode decision module is configured to further decide whether the number of recycles does not exceed a second preset threshold of recycle number less than the first preset threshold, and whether the accumulated time does not exceed a second accumulated time threshold less than the first accumulated time threshold, and decide to adopt the second charge mode in the current charging operation if the number of recycles does not exceed the second preset threshold, and the accumulated time does not exceed the second accumulated time threshold.

In the above portable computer, the mode decision module is further configured to: decide whether a power level of the battery remains above a first preset power level threshold for a first duration prior to a point when the number of recycles is between the first and second preset thresholds, and the accumulated time does not exceed the first accumulated time threshold, or a point when the accumulated time is between the first and second accumulated time thresholds, and the number of recycles does not exceed the first preset threshold; and decide to adopt the first charge mode in the current charging operation if the power level of the battery remains above the first preset power level threshold, or adopt the second charge mode in the current charging operation if the power level of the battery does not remain above the first preset power level threshold.

In the above portable computer, the mode decision module is further configured to: decide whether a number of occurrences that a power level of the battery becomes below a second preset power level threshold is less than a third preset threshold for a second duration prior to a point when the number of recycles is between the first and second preset thresholds, and the accumulated time does not exceed the first accumulated time threshold, or a point when the accumulated time is between the first and second accumulated time thresholds, and the number of recycles does not exceed the first preset threshold, if a previous charge mode was the first charge mode, and decide to adopt the second charge mode in the current charging operation if the number of occurrences is less than the third preset threshold, or adopt the first charge mode in the current charging operation if the number of occurrences is not less than the third preset threshold.

The above portable computer further comprises a second charging control device configured to control charging of the battery in the first or second charge mode and comprising: a first acquisition module configured to acquire a control parameter for a charge current of the battery while the battery is charged in the first or second charge mode; and a current control module configured to control the charging circuit based on the control parameter, so that the charge current generated by the charging circuit is modified from a first charge current to a second charge current less than the first charge current, and the battery is charged with the second charge current.

In the above portable computer, the control parameter for the charge current comprises: a first charge duration counted since starting charge; or a second charge duration counted since a voltage of the battery reaches a first preset voltage threshold; or current power level of the rechargeable battery.

In the above portable computer, if the control parameter for the charge current comprises the second charge duration counted since the voltage of the battery reaches the first preset voltage threshold, time counted from when the voltage of the battery reaches the first preset voltage threshold until the battery is fully charged is divided into at least two non-overlapping time periods each corresponding to a respective charge current, wherein a first one of any adjacent time periods of the at least two time periods corresponds to a charge current larger than that corresponding to a second one of the any adjacent time periods. When the second charge duration shifts from the first time period to the second time period, the current control module is configured to control the charging circuit so that the charge current of the battery generated by the charging circuit is modified from a first charge current corresponding to the first time period to a second charge current corresponding to the second time period.

In the above portable computer, the charge current of the battery is a maximal charge current until the voltage of the battery reaches the first preset voltage threshold.

In the above portable computer, the control parameter of the charge current further comprises a temperature of the battery. As the temperature of the battery increases, a duration in which the current control module controls the charging circuit to generate a charge current exceeding a preset current intensity is reduced.

Embodiments of the present disclosure have advantages. In the embodiments, the charge current for the rechargeable battery is controlled based on the acquired control parameter of the battery, so that the charge current is modified from a first charge current to a second charge current less than the first charge current. In this way, the charge current is decreased as the charging operation is performed, instead of always charging the battery with the maximal charge current as in the conventional scheme. This improves the lifetime of the rechargeable battery.

The charge current is control so that the maximal current is used to charge the battery at an initial stage of the charging operation, while the charge current is reduced only after the voltage of the battery reaches a threshold. This achieves a balance between improvement of the battery lifetime and time required for charging the battery.

In the embodiments, a charge mode decision parameter is further acquired and used to decide which charge mode to be adopted in a current charging operation. The charge voltages are different for different charge modes. If a high charge voltage may affect adversely the battery lifetime, a lower charge voltage may be used, and thus improve the battery lifetime. On the other hand, if a high charge voltage has only a little influence on the battery lifetime, the high charge voltage may be still used to charge the battery, and thus enable the battery to continuously supply power for a longer time period. With the embodiments of the present disclosure, it is possible to not only improve the battery lifetime but also achieve a balance between the battery's power supply performance and its lifetime.

DETAILED DESCRIPTION OF THE PREFERRED EMBODIMENTS

In charging control methods, charging control devices and portable computers according to embodiments of the present disclosure, at least one time point is present in a charging operation of the rechargeable battery, such that a first charge current used before the time point is larger than a second charge current used after the time point. In this way, it is possible to improve the battery's lifetime and reduce potential safety problems.

The inventors have found that one of key factors that influences a rechargeable battery's capacity and recycle performance is charge current. Generally, as the charge current increases, the charging operation is speeded up, while reduction in battery capacity and recycle performance is also accelerated.

Figure 1:
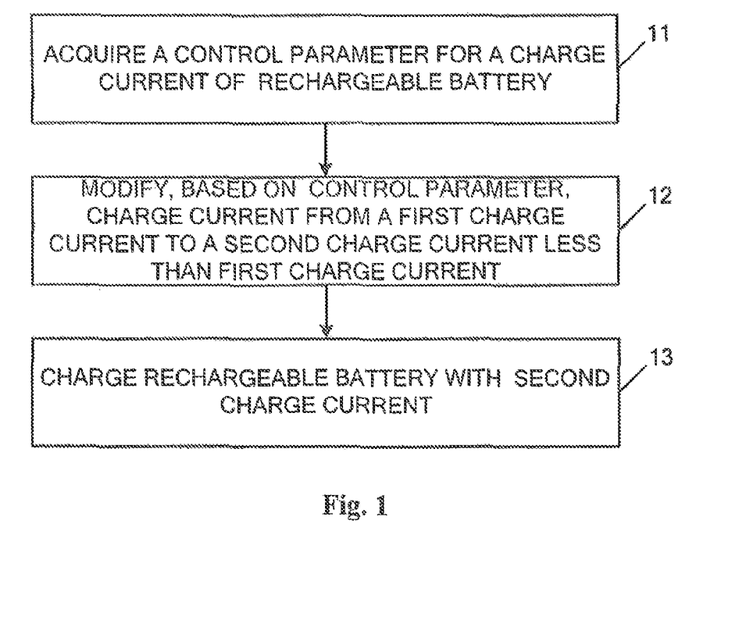
FIG. 1 is a schematic flowchart showing a charging control method for a rechargeable battery that controls a charge current according to an embodiment of the present disclosure.

In view of the above, a charging control method for a rechargeable battery according to an embodiment of the present disclosure is shown in FIG. 1, including:

Step 11, acquiring a control parameter for a charge current of the rechargeable battery;

Step 12, modifying, based on the control parameter, the charge current from a first charge current to a second charge current less than the first charge current; and Step 13, charging the rechargeable battery with the second charge current.

Figure 2:
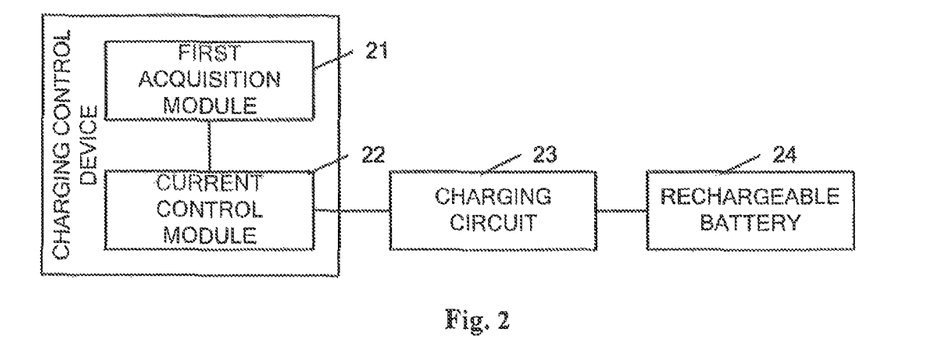
FIG. 2 is a schematic block diagram showing a charging control device for a rechargeable battery that controls a charge current according to an embodiment of the present disclosure.

A charging control device according to an embodiment of the present disclosure is used to control a charging operation of a rechargeable battery 24 provided in a portable computer which is provided with a charging circuit 23 for charging the battery 24. The charging control device as shown in FIG. 2 includes:

a first acquisition module 21 configured to acquire a control parameter for a charge current of the battery; and a current control module 22 configured to control the charging circuit 23 based on the control parameter, so that the charge current generated by the charging circuit 23 is modified from a first charge current to a second charge current less than the first charge current, and the battery 24 is charged with the second charge current.

The portable computer according to the embodiment includes a mainboard (not shown), the rechargeable battery 24 coupled to the mainboard, and the charging circuit 23 for charging the battery 24. The portable computer also includes the charging control device configured to control a charging operation of the battery 24 provided in the portable computer. The charging control device as shown in FIG. 2 includes:

a first acquisition module 21 configured to acquire a control parameter for a charge current of the battery; and a current control module 22 configured to control the charging circuit 23 based on the control parameter, so that the charge current generated by the charging circuit 23 is modified from a first charge current to a second charge current less than the first charge current, and the battery 24 is charged with the second charge current.

In certain embodiments of the present disclosure, the control parameter for a charge current may include various parameters, as long as at least one time point is present in a charging operation of the rechargeable battery, such that a first charge current used before the time point is larger than a second charge current used after the time point. In this way, it is possible to improve the battery's lifetime and reduce potential safety problems. Below an example description of various implementations is given.

<First Implementation>

In the first implementation, the control parameter for a charge current may be a first charge duration counted from the beginning of a charging operation, and I=f(t) is a descending function from the beginning of a charging operation to a time when the rechargeable battery is fully charged. I represents charge current, and t represents the first charge duration counted from the beginning of the charging operation.

In Step 12, the charge current is modified, based on the control parameter, from a first charge current to a second charge current less than the first charge current.

In the first implementation, a function I=f(t1) may be established with respect to the first chare duration t1 and the charge current I. The function is a descending function. In Step 12, the charge current at a time point may be calculated directly with the first chare duration t1. The current control module 22 may modify the charge current for the battery 24 to the calculated charge current.

An example of the function of the first chare duration t1 and the charge current I may be:

$$I=I_{max}(T-t)/T$$

$I_{max}$ denotes the maximal allowable charge current for the battery, and T denotes a time constant preset for adjusting a change rate of the charge current, The constant T may be selected to be longer than a time period required to fully charge the battery with the above-described method. By adjusting T, it is possible to control the time period required for charging the battery. For example, when T is selected to have a larger value, the time period required for charging battery will become shorter. When T is selected to have a smaller value, the time period required for charging battery will become longer.

It is also possible to make the charge current larger than or equal to the minimal charge current by adjusting T.

Another example of the function of the first chare duration t1 and the charge current I may be:

$$I=I_{max} \sin[(T-t1)\pi/2T]$$

Similarly, the time period required for charging battery may be adjusted by adjusting T.

The above examples are just some of possible functions of the first chare duration t1 and the charge current I. The function may also be any other continuously descending function.

<Second Implementation>

In the first implementation, the control parameter for a charge current may be a first charge duration counted from the beginning of a charging operation, and I=f(t) is a descending function from the beginning of a charging operation to a time when the rechargeable battery is fully charged. In the second implementation, the control parameter for a charge current may be a first charge duration counted from the beginning of a charging operation, and time counted from the beginning of the charging operation to a time when the battery is fully charged is divided into at least two non-overlapping time periods with respect to the first charge duration. Each of the two time periods corresponds to a respective charge current, and a first one of any adjacent time periods of the at least two time periods corresponds to a charge current larger than that corresponding to a second one of the any adjacent time periods.

When the second charge duration shifts from the first time period to the second time period, the charge current of the battery is modified, based on the control parameter, from a first charge current corresponding to the first time period to a second charge current corresponding to the second time period.

Table 1 shows correspondence between time periods and charge currents in a case where the time required for charging is divided into four non-overlapping time periods.

TABLE 1

| First Charge Duration (t) | Charge Current (I) |
|---|---|
| 0~1000 seconds | $I_{max}$ |
| 1000~2000 seconds | $0.9\,I_{max}$ |
| 2000~3000 seconds | $0.8\,I_{max}$ |
| >3000 seconds | $0.7\,I_{max}$ |

The number of the divided time periods may be increased or decreased, and the length of each time period may be identical to or different from another time period, as long as a first one of any adjacent time periods corresponds to a charge current larger than that corresponding to a second one of the any adjacent time periods. Each time period should correspond to a charge current larger than or equal to the minimal charge current and less than or equal to the maximal charge current.

In the second implementation, the control parameter for charge current may also include a temperature of the battery. As the temperature of the battery increases, a duration in which the battery is charged with a charge current exceeding a preset current intensity is reduced. In this way, the battery may be protected. Below an example is described.

When the battery temperature is lower than or equal to 45 degrees, the relationship between the charge current and the charge duration is shown in Table 2:

TABLE 2

| First Charge Duration (t) | Charge Current (I) |
|---|---|
| 0~1000 seconds | $I_{max}$ |
| 1000~2000 seconds | $0.9\,I_{max}$ |
| 2000~3000 seconds | $0.8\,I_{max}$ |
| >3000 seconds | $0.7\,I_{max}$ |

When the battery temperature is higher than 45 degrees, the relationship between the charge current and the charge duration is shown in Table 3:

TABLE 3

| First Charge Duration (t) | Charge Current (I) |
|---|---|
| 0~250 seconds | $I_{max}$ |
| 250~500 seconds | $0.9\,I_{max}$ |

TABLE 3-continued

| First Charge Duration (t) | Charge Current (I) |
|---|---|
| 500~750 seconds | $0.8\,I_{max}$ |
| >750 seconds | $0.7\,I_{max}$ |

That is, when the battery temperature exceeds 45 degrees, the duration in which the battery is charged with a charge current higher than $0.75\,I_{max}$ is 750 s, which is much less than the duration (3000 s) in which the battery is charged with a charge current higher than $0.75\,I_{max}$ when the battery temperature does not exceed 45 degrees.

<Third Implementation>

The second implementation takes only the charge duration into account. However, when the remaining power level of the battery is low, the magnitude of the charge current has less influence on the battery capacity and recycle performance. Accordingly, in the third implementation, the control parameter for charge current is set as a second charge duration t2 counted since a voltage of the battery reaches a first preset voltage threshold (e.g., 3.9V) in a charge operation (that is, an accumulated time for a die voltage of the battery remaining higher than a preset voltage threshold). Further, time counted from when the voltage of the battery reaches the first preset voltage threshold until the battery is fully charged is divided into at least two non-overlapping time periods with respect to the second charge duration t2. Each of the at least two time periods corresponds to a respective charge current, and a first one of any adjacent time periods of the at least two time periods corresponds to a charge current larger than that corresponding to a second one of the any adjacent time periods. The charge current of the battery is a maximal charge current until the voltage of the battery reaches the first preset voltage threshold Table 4 shows correspondence between time periods and charge currents in a case where time counted from when the voltage of the battery reaches the preset voltage threshold until the battery is fully charged is divided into four non-overlapping time periods.

TABLE 4

| Charge duration counted from when the voltage of the battery reaches the preset voltage threshold (t) | Charge Current (I) |
|---|---|
| 0~1000 seconds | $I_{max}$ |
| 1000~2000 seconds | $0.9\,I_{max}$ |
| 2000~3000 seconds | $0.8\,I_{max}$ |
| >3000 seconds | $0.7\,I_{max}$ |

The number of the divided time periods may be increased or decreased, and the length of each time period may be identical to or different from another time period, as long as a first one of any adjacent time periods corresponds to a charge current larger than that corresponding to a second one of the any adjacent time periods. Each time period should correspond to a charge current larger than or equal to the minimal charge current and less than or equal to the maximal charge current.

In the second implementation, the control parameter for charge current may also include a temperature of the battery. As the temperature of the battery increases, a duration in which the battery is charged with the maximal charge current is reduced to protect the battery. That is, the current control module controls the charging circuit to generate the maximal charge current (or a current exceeding a preset current intensity, e.g., $0.75\,I_{max}$) for a short time period, as shown in Table 5:

TABLE 5

| Charge duration counted from when the voltage of the battery reaches the preset voltage threshold (t) | Charge Current (I) |
|---|---|
| 0~250 seconds | $I_{max}$ |
| 250~500 seconds | $0.9\ I_{max}$ |
| 500~750 seconds | $0.8\ I_{max}$ |
| >750 seconds | $0.7\ I_{max}$ |

In embodiments of the present application, the parameter of charge duration is set in associated with the temperature. As the battery temperature increases, a duration in which the battery is charged with a charge current exceeding a preset current intensity (e.g., $0.8\ I_{max}$) is reduced. In a case whether the temperature of the battery die is higher, the duration in which a higher charge current is used to charge the battery may be shortened, and the charging operation is shifted at an earlier stage to a state of charging the battery with a lower charge current. In this way, it is possible to avoid charging a battery with a larger current with the temperature of the battery die being higher and thus avoid any unrepairable damage to the battery.

<Fourth Implementation>

In the fourth implementation the control parameter for a charge current may be a current power level q of the battery, and I=f(q) is a descending function from the beginning of a charging operation to a time when the rechargeable battery is fully charged. I represents charge current.

In Step 12, the charge current is modified, based on the control parameter, from a first charge current to a second charge current less than the first charge current.

In the fourth implementation, a function I=f(q) may be established with respect to the current power level q of the battery and the charge current I. The function is a descending function. In Step 12, the charge current at a time point may be calculated directly with the current power level q of the battery, and the charge current for the battery may be modified to the calculated charge current.

An example of the function of the current power level q of the battery and the charge current I may be:

$I=I_{max}(Q-q)/Q$ $I_{max}$ denotes the maximal allowable charge current for the battery, and Q denotes a power level constant preset for adjusting a change rate of the charge current. The constant Q may be selected to be larger than or equal to the power level when the battery is fully charged. By adjusting Q, it is possible to control the time period required for charging the battery. For example, when Q is selected to have a larger value, the time period required for charging battery will become shorter. When Q is selected to have a smaller value, the time period required for charging battery will become longer.

It is also possible to make the charge current larger than or equal to the minimal charge current by adjusting Q.

Another example of the function of the current power level q and the charge current I may be:

$I=I_{max} \sin[(Q-q)\pi/2\ Q]$

Similarly, the time period required for charging battery may be adjusted by adjusting Q.

The above examples are just some of possible functions of the current power level q and the charge current I. The function may also be any other continuously descending function.

<Fifth Implementation>

In the fifth implementation the control parameter for the charge current is the current power level q of the battery, and power levels are divided into at least two non-overlapping power intervals from the beginning of the charging operation until the battery is fully charged with respect to the current power level. Each of the power intervals corresponds to a charge current, and of any adjacent power intervals, the power interval having larger power levels corresponds to a charge current larger than that corresponding to a power interval having smaller power levels.

Table 6 shows correspondence between power intervals and charge currents in a case where the power levels are divided into four non-overlapping power intervals.

TABLE 6

| Power Level | Charge Current (I) |
|---|---|
| 0~60% $Q_{max}$ | $I_{max}$ |
| 60% $Q_{max}$~70% $Q_{max}$ | $0.9\ I_{max}$ |
| 80% $Q_{max}$~90% $Q_{max}$ | $0.8\ I_{max}$ |
| 90% $Q_{max}$~100% $Q_{max}$ | $0.7\ I_{max}$ |

The number of the power intervals may be increased or decreased, and the range of power levels in each interval may be identical to or different from another interval, as long as among any adjacent power intervals, the power interval having larger power levels corresponds to a charge current larger than that corresponding to a power interval having smaller power levels. The respective charge current corresponding to each power interval should higher than or equal to the minimal charge current and lower than or equal to the maximal charge current.

When the battery temperature is lower than or equal to 45 degrees, the relationship between the charge current and the charge duration is shown in Table 7:

TABLE 7

| Charge duration (t) in which the voltage of the battery exceeds 3.9 V | Charge Current (I) |
|---|---|
| 0~1000 seconds | $I_{max}$ |
| 1000~2000 seconds | $0.9\ I_{max}$ |
| 2000~3000 seconds | $0.8\ I_{max}$ |
| >3000 seconds | $0.7\ I_{max}$ |

When the battery temperature is higher than 45 degrees, the relationship between the charge current and the charge duration is shown in Table 8:

TABLE 8

| Charge duration (t) in which the voltage of the battery exceeds 3.9 V | Charge Current (I) |
|---|---|
| 0~250 seconds | $I_{max}$ |
| 250~500 seconds | $0.9\ I_{max}$ |
| 500~750 seconds | $0.8\ I_{max}$ |
| >750 seconds | $0.7\ I_{max}$ |

Embodiments of the present disclosure will be described in detail by taking the above tables as example. The method of the present disclosure includes the following steps.

Step A1, start charging the battery;

Step A2, determine whether the battery temperature becomes higher than a preset temperature threshold (e.g., 45 degrees centigrade); if Yes, set a time coefficient X as X1; if No, set the time coefficient X as X2, and proceed to Step A3; X1 is less than X2, and the subsequent steps will be explained by setting X1 to 1, and X2 to 4;

Step A3, determine whether the battery voltage exceeds a preset voltage threshold (e.g., 3.9 V); if Yes, proceed to Step A4; if No, proceed to Step A11;

Step A4, determine whether the charge duration in which the battery voltage exceeds 3.9 V is smaller than X and a unit time interval (which may be set as required, such as 250 s); if Yes, proceed to Step A5; if No, proceed to Step A6;

Step A5, charge the battery with $I_{max}$, and proceed to Step A12;

Step A6, determine whether the charge duration in which the battery voltage exceeds 3.9 V is smaller than 2× and the unit time interval; if Yes, proceed to Step A7; if No, proceed to Step A8;

Step A7, charge the battery with $0.9I_{max}$, and proceed to Step A12;

Step A8, determine whether the charge duration in which the battery voltage exceeds 3.9 V is smaller than 3× and the unit time interval; if Yes, proceed to Step A9; if No, proceed to Step A10;

Step A9, charge the battery with $0.8I_{max}$, and proceed to Step A12;

Step A10, charge the battery with $0.7I_{max}$, and proceed to Step A12;

Step A11, charge the battery with $I_{max}$, and proceed to Step A12;

Step A12, determine whether the charging operation is completed; if Yes, end the current charging operation; if No, proceed to Step A2.

The inventors have found that one of key factors that influences a rechargeable battery's capacity and recycle performance is charge voltage. Generally, as the charge voltage increases, the rechargeable battery can continuously provide power for a longer time period, while deterioration in battery capacity and recycle performance is also accelerated.

Figure 3:
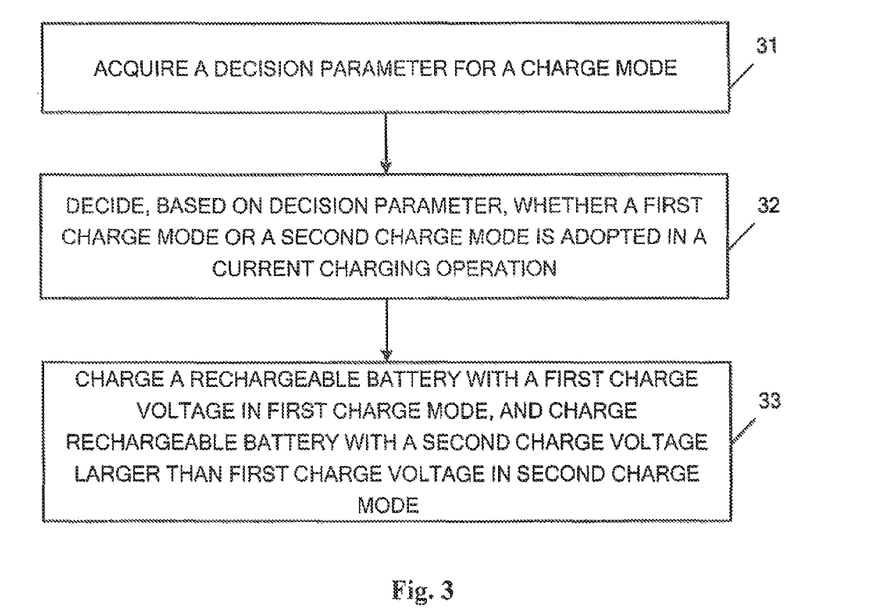
FIG. 3 is a schematic flowchart showing a charging control method for a rechargeable battery that controls a charge voltage according to an embodiment of the present disclosure.

In view of the above, a charging control method for a rechargeable battery according to an embodiment of the present disclosure is shown in FIG. 3, including:

Step 31, acquiring a decision parameter for a charge mode;

Step 32, deciding, based on the decision parameter, whether a first charge mode or a second charge mode is adopted in a current charging operation; and Step 33, charging a rechargeable battery with a first charge voltage in the first charge mode, and charging the rechargeable battery with a second charge voltage larger than the first charge voltage in the second charge mode.

In embodiments of the present disclosure, the second charge voltage may be selected to be the maximal allowable charge voltage of the battery.

The first charge voltage should be higher than a present threshold to guarantee the desired time period for which the battery can continuously supply power.

In embodiments of the present disclosure, the decision parameter for a charge mode may be in various forms as specified in the following.

<First implementation>

In the first implementation, the decision parameter for a charge mode may be the number of recycles the battery has undergone.

In Step 32, the charge mode may be determined by determining whether the number of recycles exceeds a first preset threshold of recycle number (e.g., 150), and deciding to adopt the first charge mode in the current charging operation if the number of recycles exceeds the first preset threshold, otherwise adopt the second charge mode.

The inventors have found that with the same charge voltage, influence on the battery capacity and recycle performance is greater at a late stage of the battery's lifetime than an early stage of the battery's lifetime. In view of this fact, a recycle number threshold is set in the first implementation. When the number of recycles is lower than the threshold, a larger voltage is used to charge the battery. In this way, it is possible avoid impose a great adverse effect on the battery capacity and recycle performance, while improve the battery in terms of how long it can continuously provide power. On the other hand, if the number of recycles has exceeded or equal to the threshold, a lower charge voltage may be used to charge the battery, since a higher voltage will cause significant deterioration in the battery capacity and recycle performance. In this way, it is possible to improve the battery's recycle performance.

Compared with conventional methods of charging a battery with a constant maximal voltage, the charging control method of the embodiments can greatly improve the battery's recycle performance and increase the number of recycles for the battery.

<Second Implementation>

In the second implementation, the decision parameter for a charge mode may be an accumulated time for a die voltage of the battery remaining higher than a second preset voltage threshold (e.g., 4.1V).

In Step 32, the charge mode may be decided by deciding whether the accumulated time for the die voltage of the battery remaining higher than the second preset voltage exceeds a first accumulated time threshold, and deciding to adopt the first charge mode in the current charging operation if the accumulated time exceeds the first accumulated time threshold, or adopt the second charge mode if the accumulated time does not exceed the first accumulated time threshold.

The inventors have found that the recovery capability of a rechargeable battery is closely related to the die voltage of the battery in an idle state. It has been found through relevant experiments that the battery capacity will reduce by about 8% after the battery is fully charged and placed in an idle state for one year. The battery capacity will reduce by about 4% after the battery is charged to 80% of its full capacity and placed in an idle state for one year. Further, the battery capacity will reduce by about only 1% after the battery is charged to 50% of its full capacity and placed in an idle state for one year.

Conventional battery management methods generally maintain the power level of a battery in a high level (i.e., the die voltage is maintained in a high voltage state), and this leads to reduction in battery capacity.

In embodiments of the present disclosure, if the accumulated time for a die voltage of the battery remaining higher than a second preset voltage threshold (e.g., 4.1V) exceeds the first accumulated time threshold (e.g., 90 days), it indicates that the battery has been placed in an idle state with a high die voltage for a long time. In this case, the first charge mode should be adopted to charge the battery with a lower charge voltage, so that the battery capacity is lower than the battery's maximal capacity. Accordingly, it is possible to suppress the deterioration of the battery capacity, and thus improve the battery's recycle performance.

<Third Implementation>

In the third implementation, the decision parameter for a charge mode includes a number of recycles the battery has undergone, and an accumulated time for a die voltage of the battery remaining higher than a second preset voltage.

Figure 4:
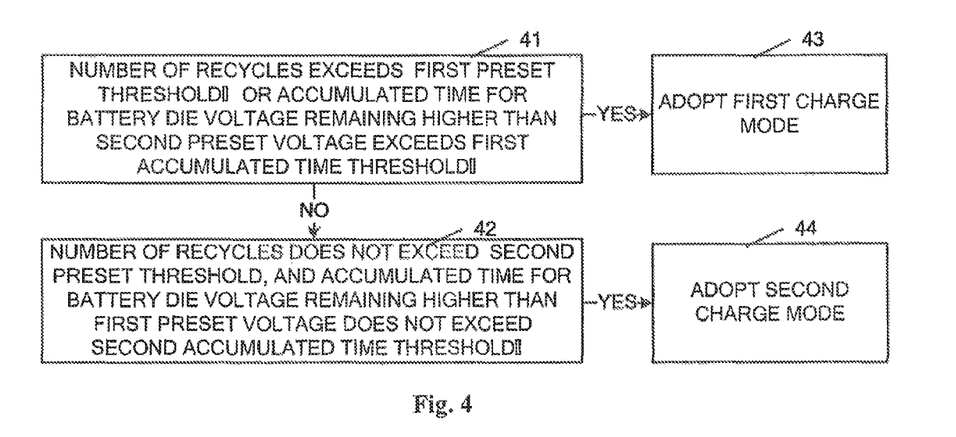
FIG. 4 is a schematic flowchart showing a detailed process of selecting a charging mode according to an embodiment of the present disclosure.

How to decide a charge mode at Step 32 will be explained with reference to FIG. 4.

Step 41, decide whether the number of recycles exceeds a first preset threshold of recycle number, and whether the accumulated time for the die voltage of the battery remaining higher than the second preset voltage exceeds a first accumulated time threshold;

Step 43, decide to adopt the first charge mode in the current charging operation if the number of recycles exceeds the first preset threshold, or if the accumulated time exceeds the first accumulated time threshold;

Step 42, if it is decided at Step 41 that the number of recycles does not exceed the first preset threshold, and the accumulated time does not exceed the first accumulated time threshold, decide further whether the number of recycles does not exceed a second preset threshold of recycle number (which is less than the first preset threshold, for example, 50) and whether the accumulated time does not exceed a second accumulated time threshold (which is less than the first accumulated time threshold, for example, 30 days); and Step 44, decide to adopt the second charge mode in the current charging operation if the number of recycles does not exceed the second preset threshold, and the accumulated time does not exceed the second accumulated time threshold.

If the number of recycles exceeds the first preset threshold, or if the accumulated time exceeds the first accumulated time threshold, it indicates that the battery has been recycled and used for many times, or the battery has been placed in an idle state with a high die voltage for a long time. In each of the cases, the battery should be charged with a low voltage so as to improve the battery's recycle performance.

On the other hand, if the number of recycles does not exceed the second preset threshold, and the accumulated time does not exceed the second accumulated time threshold (less than the first accumulated time threshold), it indicates that the battery has been recycled for a few times, and the battery has been placed in an idle state with a high die voltage for a short time. In this case, the battery can be charged with a high voltage, without its recycle performance being seriously affected by the high voltage. Meanwhile, charging with a high voltage will enable the battery to continuously supply power for a longer time.

In the third implementation, the following situations are also taken into account.

The number of recycles is between the first and second preset thresholds of recycle number, and the accumulated time does not exceed the first accumulated time threshold.

The accumulated time is between the first and second accumulated time thresholds, and the number of recycles does not exceed the first preset threshold of recycle number.

In both of the above situations, it may be decided to adopt any of the first or second charge modes. However, in embodiments of the present disclosure, the decision may be made as follows in order to further improve the battery's recycle performance.

According to the above third implementation, either of the above two situations belongs to the situation of adopting the first charge mode or the situation of adopting the second charge mode. As a result, it is necessary to take additional parameter or conditions into account in order to decide which charge mode to be adopted. In embodiments of the present disclosure, the decision may be made as follows.

It is decided whether a power level of the battery remains above a first preset power level threshold (e.g., above 20% of the maximal power level of the battery) for a first duration (e.g., 120 hours) prior to a point when the number of recycles is between the first and second preset thresholds, and the accumulated time does not exceed the first accumulated time threshold, or a point when the accumulated time is between the first and second accumulated time thresholds, and the number of recycles does not exceed the first preset threshold.

If the answer is yes, it indicates that the battery is not used up to its full capacity each time the user uses it. In this case, the first charge mode may be adopted to charge the battery with the first charge voltage. In this way, it is possible to improve the battery's recycle performance. If the answer is no, it indicates that the battery is used up to almost its full capacity each time the user uses it. In this case, it is important to ensure that the battery can continuously supply power for a longer time so as to meet the user's usage requirement. Therefore, the second charge mode may be adopted to charge the battery with the second charge voltage.

As illustrated in the above, the first charge mode may be adopted in either of the above two situations. When the first charge mode is adopted, it may be desired to shift to the second charge mode at some appropriate time. To this end, embodiments of the present disclosure provide the following decision-making process.

In preparation for charging the battery again after a previous charging operation with the first charge mode, it is decided whether a number of occurrences that a power level of the battery has remained below a second preset power level threshold (which is less than the first preset power level threshold, for example, 10% of the maximal power level of the battery) for a second duration (which is less than the first duration, for example, 16 hours) is less than a third preset number threshold (e.g., 2). If the answer is yes, it indicates that the user continuously use the battery up to almost its full capacity. In this case, it is important to ensure that the battery can continuously supply power for a longer time so as to meet the user's usage requirement. Therefore, the second charge mode may be adopted to charge the battery with the second charge voltage. If the answer is no, it indicates that the battery is not used up to its full capacity when the user uses it. In this case, the first charge mode may be adopted to charge the battery with the first charge voltage, and thus it is possible to improve the battery's recycle performance.

The above specific numbers or values are merely examples for illustration, and other numbers or values may also be used depending on application requirements.

The above described charging control method for controlling a charge current may be combined with these embodiments of the present disclosure after the charge mode is decided. Here, detailed description thereof is omitted.

Figure 5:
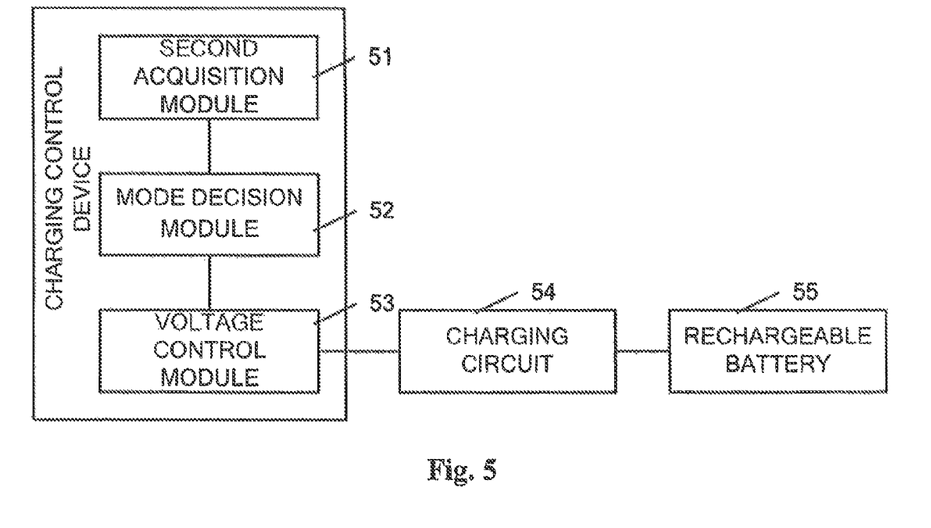
FIG. 5 a schematic flowchart showing a charging control device for a rechargeable battery that controls a charge voltage according to an embodiment of the present disclosure.

According to embodiments of the present disclosure, a charging control device is used to control charging of a rechargeable battery 55 provided in a portable computer which includes a charging circuit 54 for charging the battery 55. As shown in FIG. 5, the charging control device may include:

a second acquisition module 51 configured to acquire a decision parameter for a charge mode;

a mode decision module 52 configured to decide, based on the decision parameter, whether a first charge mode or a second charge mode is adopted in a current charging operation; and a voltage control module 53 configured to control the charging circuit 54 to charge the battery 55 with a first charge voltage in the first charge mode, and to charge the battery 55 with a second charge voltage larger than the first charge voltage in the second charge mode.

According to embodiments of the present disclosure, a portable computer including a mainboard (not shown), a rechargeable battery 55 connected to the mainboard, and a charging circuit 54 configured to charge the battery. The portable computer further includes a charging control device configured to control charging of the battery 55 provided in the portable computer. The charging control device may include:

a second acquisition module 51 configured to acquire a decision parameter for a charge mode;

a mode decision module 52 configured to decide, based on the decision parameter, whether a first charge mode or a second charge mode is adopted in a current charging operation; and a voltage control module 53 configured to control the charging circuit 54 to charge the battery 55 with a first charge voltage in the first charge mode, and to charge the battery 55 with a second charge voltage larger than the first charge voltage in the second charge mode.

The foregoing illustrates example embodiments of the present disclosure. An ordinary skilled person in the art will understand that various variations and modifications may be made within the principle and spirit of the present application, and all should fall within the scope of the present application.

What is claimed is:

1. A charging control method, comprising:
acquiring a decision parameter for a charge mode;
deciding, based on the decision parameter, whether a first charge mode or a second charge mode is adopted in a current charging operation; and
charging a rechargeable battery with a first charge voltage in the first charge mode, and charging the rechargeable battery with a second charge voltage larger than the first charge voltage in the second charge mode;
wherein the decision parameter comprises a number of recycles the battery has undergone, and an amount of time in which a capacity of the battery remaining higher than a second preset voltage;
said deciding, based on the decision parameter, whether the first charge mode or the second charge mode is adopted in the current charging operation comprises deciding whether the number of recycles exceeds a first preset threshold of recycle number, and whether the amount of time exceeds a first accumulated time threshold,
deciding to adopt the first charge mode in the current charging operation if the number of recycles exceeds the first preset threshold, or if the amount of time exceeds the first accumulated time threshold, if the number of recycles does not exceed the first preset threshold, and the amount of time does not exceed the first accumulated time threshold, deciding further whether the number of recycles does not exceed a second preset threshold of recycle number less than the first present threshold, and whether the amount of time does not exceed a second accumulated time threshold less than the first accumulated time threshold, and
deciding to adopt the second charge mode in the current charging operation if the number of recycles does not exceed the second preset threshold, and the amount of time does not exceed the second accumulated time threshold.

2. The charging control method of claim 1, wherein said deciding, based on the decision parameter, whether a first charge mode or a second charge mode is adopted in a current charging operation further comprises:
deciding whether a power level of the battery remains above a first preset power level threshold for a first duration prior to a point when the number of recycles is between the first and second preset thresholds, and the amount of time does not exceed the first accumulated time threshold, or a point when the amount of time is between the first and second accumulated time thresholds, and the number of recycles does not exceed the first preset threshold, and
deciding to adopt the first charge mode in the current charging operation if the power level of the battery remains above the first preset power level threshold, or adopt the second charge mode in the current charging operation if the power level of the battery does not remain above the first preset power level threshold.

3. The charging control method of claim 2, wherein said deciding, based on the decision parameter, whether a first charge mode or a second charge mode is adopted in a current charging operation further comprises:
deciding whether a number of occurrences that a power level of the battery becomes below a second preset power level threshold is less than a third preset threshold for a second duration prior to a point when the number of recycles is between the first and second preset thresholds, and the amount of time does not exceed the first accumulated time threshold, or a point when the amount of time is between the first and second accumulated time thresholds, and the number of recycles does not exceed the first preset threshold, if a previous charge mode was the first charge mode, and
deciding to adopt the second charge mode in the current charging operation if the number of occurrences is less than the third preset threshold, or adopt the first charge mode in the current charging operation if the number of occurrences is not less than the third preset threshold.

4. A portable computer comprising a mainboard, a rechargeable battery connected to the mainboard, and a charging circuit configured to charge the battery,
wherein the portable computer further comprises a first charging control device configured to control charging of the battery provided in the portable computer and comprising:
a second acquisition module configured to acquire a decision parameter for a charge mode;
a mode decision module configured to decide, based on the decision parameter, whether a first charge mode or a second charge mode is adopted in a current charging operation;
a voltage control module configured to control the charging circuit to charge the battery with a first charge voltage in the first charge mode, and to charge the battery with a second charge voltage larger than the first charge voltage in the second charge mode;
wherein the decision parameter comprises a number of recycles the battery has undergone, and an amount of time in which the battery remaining higher than a second preset voltage; and
the mode decision module is configured to decide whether the number of recycles exceeds a first preset threshold of recycle number, and whether the amount of time exceeds a first accumulated time threshold, and decide to adopt the first charge mode in the current charging operation if the number of recycles exceeds the first preset threshold, or if the accumulated time exceeds the first accumulated time threshold, if the number of recycles does not exceed the first preset threshold, and the accumulated time does not exceed the first accumulated time threshold, the mode decision module is configured to further decide whether the number of recycles does not exceed a second preset threshold of recycle number less than the first present threshold, and whether the amount of time does not exceed a second accumulated time threshold less than the first accumulated time threshold, and decide to adopt the second charge mode in the current charging operation if the number of recycles does not exceed the second preset threshold, and the amount of time does not exceed the second accumulated time threshold.

5. The portable computer of claim 4, wherein the mode decision module is further configured to:

decide whether a power level of the battery remains above a first preset power level threshold for a first duration prior to a point when the number of recycles is between the first and second preset thresholds, and the amount of time does not exceed the first accumulated time threshold, or a point when the amount of time is between the first and second accumulated time thresholds, and the number of recycles does not exceed the first preset threshold, and decide to adopt the first charge mode in the current charging operation if the power level of the battery remains above the first preset power level threshold, or adopt the second charge mode in the current charging operation if the power level of the battery does not remain above the first preset power level threshold.

6. The portable computer of claim 5, wherein the mode decision module is further configured to:

decide whether a number of occurrences that a power level of the battery becomes below a second preset power level threshold is less than a third preset threshold for a second duration prior to a point when the number of recycles is between the first and second preset thresholds, and the amount of time does not exceed the first accumulated time threshold, or a point when the amount of time is between the first and second accumulated time thresholds, and the number of recycles does not exceed the first preset threshold, if a previous charge mode was the first charge mode, and decide to adopt the second charge mode in the current charging operation if the number of occurrences is less than the third preset threshold, or adopt the first charge mode in the current charging operation if the number of occurrences is not less than the third preset threshold.

* * * * *